(12) United States Patent
Noguchi et al.

(10) Patent No.: US 6,707,387 B2
(45) Date of Patent: Mar. 16, 2004

(54) OPERATING DEVICE FOR OPERATING APPARATUS MOUNTED ON VEHICLE

(75) Inventors: Kunihiko Noguchi, Tokyo (JP); Jun Tosaka, Tokyo (JP); Hirohisa Meguro, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/146,808

(22) Filed: May 17, 2002

(65) Prior Publication Data
US 2002/0171627 A1 Nov. 21, 2002

(30) Foreign Application Priority Data
May 17, 2001 (JP) ........................................ 2001-148185

(51) Int. Cl.⁷ ................................................. G08B 3/00
(52) U.S. Cl. ............... 340/691.6; 340/525; 340/815.78; 345/161
(58) Field of Search ........................ 340/815.4, 815.6, 340/693.1, 678, 691.5, 815.78, 980; 701/525; 345/716, 161, 7, 8

(56) References Cited

U.S. PATENT DOCUMENTS 6,128,553 A * 10/2000 Gordon et al. .................. 701/3
6,241,611 B1 * 6/2001 Takeda et al. ............... 345/161

FOREIGN PATENT DOCUMENTS

| EP | 0911750 | * 4/1999 | ............... 340/815.4 |
| JP | 5-221272 | 8/1993 | |
| JP | 7-114859 | 5/1995 | |
| JP | 2000-149721 | 5/2000 | |

* cited by examiner

*Primary Examiner*—Anh V La
(74) *Attorney, Agent, or Firm*—Foley & Lardner

(57) ABSTRACT

An operating device for operating apparatus mounted on the vehicle includes a dial being rotatable, a hand support, and a plurality of switches arranged adjacent to the dial. The apparatus mounted on the vehicle are turned on and off by a user when the switches are operated by the user. A pair of the openings from which operating portions of the dial protrudes are defined on left and right side surfaces of the hand support, respectively. In this way, the occurrence of misoperation is prevented.

12 Claims, 15 Drawing Sheets ic device for operating apparatus mounted on a vehicle, automobile telephone, electronic mail apparatus and vehicle information apparatus.

OPERATING DEVICE FOR OPERATING APPARATUS MOUNTED ON VEHICLE

BACKGROUND OF THE INVENTION

1. Field of the Invention

The present invention relates to an operating device for unifiably operating an audio and video apparatus and an air-conditioner, and also unifiably operating apparatus mounted on a vehicle such as a navigation device, automobile telephone, electronic mail apparatus and vehicle information apparatus.

2. Description of the Related Art

A vehicle has been equipped with a car audio apparatus, air-conditioner and so forth. Further, image displaying apparatus such as a television set and car navigation apparatus have been recently mounted on a vehicle. Furthermore, when an automobile telephone and image displaying apparatus, which can be operated in a state of keeping a user's hand free, are mounted on a vehicle, it has become possible to send and receive electronic mails by the user. Therefore, it has become possible for the user to drive an automobile while the user is communicating with the outside of the automobile. Further, various apparatus are mounted on the vehicle. As a result, operation of these various apparatus has become complicated, and these apparatus are not necessarily handy for the user. In order to solve the above problems, multi-functional switches have been developed in which the number of operation switches is reduced as small as possible so as to make the operating switches to be unified and make the design around a dashboard simple so that the appearance can be enhanced and the operating property can be improved.

For example, the following inventions have been proposed. As disclosed in Japanese Unexamined Patent Publication No.Hei.5-221272, a joy stick is arranged and further press button switches are arranged in the periphery of the jog stick, and the switches and the joy stick are operated according to a display screen. Further, as disclosed in Japanese Unexamined Patent Publication No.Hei.7-114859, a multi-switch, which can be operated being rotated and pressed, is arranged close to a steering wheel, and operation is conducted according to a display screen.

FIG. 11 is a perspective view showing the periphery of a driver's seat of a vehicle equipped with a conventional operating device for operating apparatus mounted on a vehicle which is disclosed in Japanese Unexamined Patent Publication No. 2000-149721. In the drawing, reference numeral 100 is a dashboard, reference numeral 101 is a center console arranged at the center of the dashboard 100, reference numeral 102 is an operating device for operating apparatus mounted on a vehicle which is arranged on the center console 101, reference numeral 103 is a screen display device arranged on the center console 101 together with the operating device for operating apparatus mounted on a vehicle, reference numeral 104 is a meter display section for displaying a running speed and others, and reference numeral 105 represents a plurality of press button type switches for turning on and off respective devices such as an audio device of a radio set or CD player, air-conditioner, car navigation device and automobile telephone.

The operating device 102 for operating apparatus mounted on a vehicle shown in the drawing is hemispherical and attached in such a manner that the operating device 102 protrudes from a surface of the center console 101. This hemispherical portion of the operating device 102 can be freely rotated in all directions of before and behind and right and left. On the center console 101, the switches 105 arranged in an upper portion of the operating device 102 for operating apparatus mounted on a vehicle are arranged at positions so that the switches 105 can be operated by a user when the user stretches out his fingers while he is holding the operating device 102 with his hand.

Next, operation of the operating device 102 for operating apparatus mounted on a vehicle will be explained below. In the case where the driver wants to get some information or sets each device in detail, the driver operates the switch 105 with his fingers so as to select a device such an audio device or air-conditioner. Due to the above operation conducted by the driver, directions are displayed on a screen of the screen display device 103. According to the directions, the driver conducts operation. In order to select an item or set a numeral on the displayed screen, the driver holds and operates the operating device 102 for operating apparatus mounted on a vehicle in the same manner as that of holding and operating a mouse of a personal computer and moves a cursor displayed on the screen so that the driver can conduct setting and selecting operation.

In the operating device 102 for operating apparatus mounted on a vehicle, the operating portion of which can be freely rotated, it is possible to predict that the driver conducts operation on the display screen of the screen display device 103 which is different from his intention when the driver conducts operation with an unstable posture while he is driving a vehicle. In order to prevent the occurrence of the above problems, the operating device 102 for operating apparatus mounted on a vehicle is equipped with a device by which an operation force is adjusted so that a movable portion can not be easily moved. This device for adjusting the operation force suppresses a movement of the movable portion, for example, by using a solenoid. Therefore, it is necessary to provide a control unit for controlling the solenoid. Accordingly, this device for adjusting the operation force is disadvantageous in that the mechanism becomes complicated and further the manufacturing cost is increased.

The present invention has been accomplished to solve the above problems. It is an object of the present invention to provide an operating device for operating apparatus mounted on a vehicle capable of being operated according to an intention of a driver without causing misoperation even if the driver is running the vehicle without providing a device of controlling an operation force of the switch mechanism.

SUMMARY OF THE INVENTION

According to a first aspect of the invention, there is provided an operating device for operating apparatus mounted on a vehicle on a basis of a display on a screen display device, the operating device disposed close to a driver's seat the operating device including a dial being rotatable, a hand support, and a plurality of switches arranged adjacent to the dial. The apparatus mounted on the vehicle are turned on and off by a user when the switches are operated by the user. A pair of the openings from which operating portions of the dial protrudes are defined on left and right side surfaces of the hand support, respectively.

According to a second aspect of the invention, the operating device according further includes a multidirectional switch protruding from an upper surface of the dial. The hand support covers the upper surface and a predetermined outer peripheral side surface of the dial. The hand support defines a through hole on an upper surface thereof, into which the multidirectional switch is inserted.

According to a third aspect of the invention, a push switch is built in the multidirectional switch.

According to a fourth aspect of the invention, the dial cover covers the multidirectional switch so that the multidirectional switch does not protrude from an upper surface of the hand support.

According to a fifth aspect of the invention, the switches are arranged so that a user can operate the switches while the user is putting his hand on the hand support.

According to a sixth aspect of the invention, the switches are arranged symmetrically with respect to a direction in which the hand support extends.

According to a seventh aspect of the invention, the operating device further includes an enter switch disposed at a peripheral portion of the dial.

According to an eighth aspect of the invention, the operation device further includes an enter switch disposed on a lower side of the dial.

According to a ninth aspect of the invention, items displayed on the display screen device are arranged on a circumference and rotation of the dial causes a selected item to rotate.

DETAILED DESCRIPTION OF THE PREFERRED EMBODIMENTS

An embodiment of the present invention will be explained below.

Embodiment 1

Figure 1:
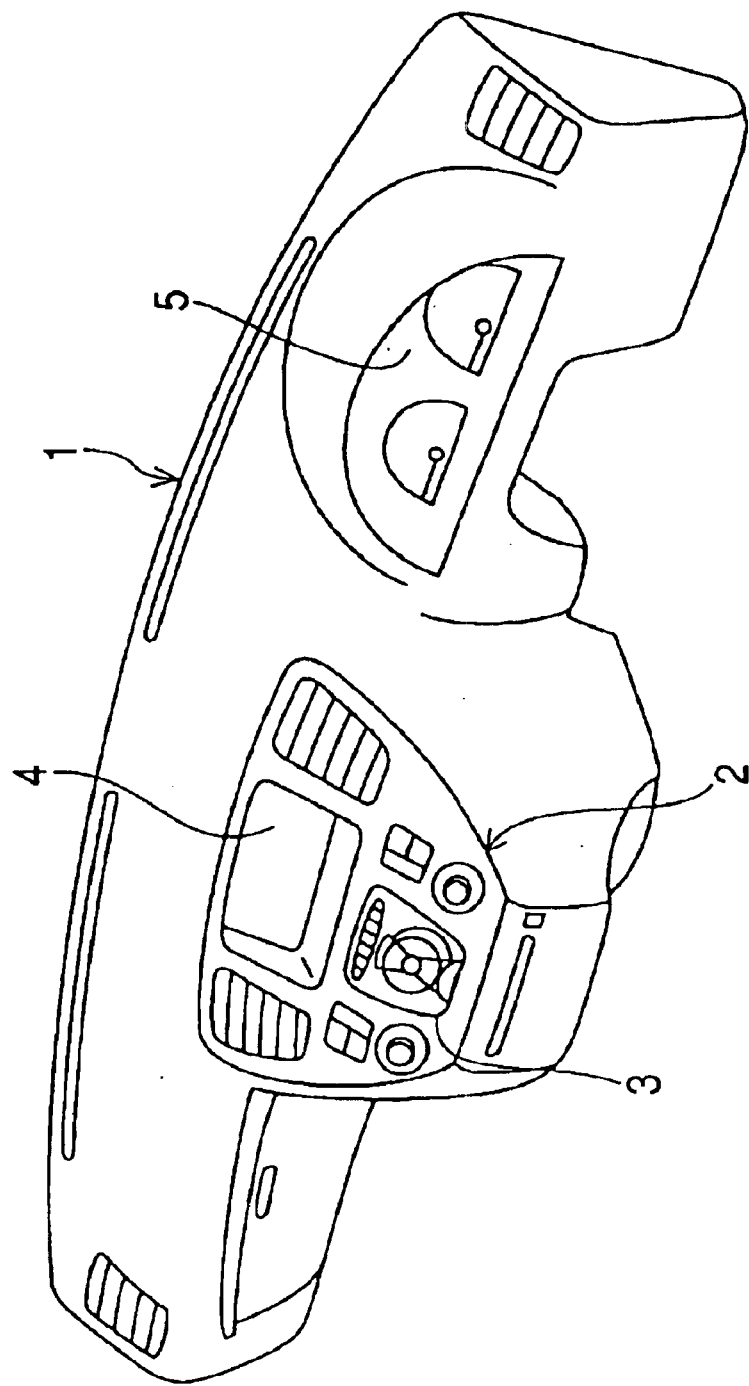
FIG. 1 is a perspective view showing a dashboard of a vehicle according to Embodiment 1 of the present invention.

FIG. 1 is a perspective view showing a dashboard of a vehicle. In the view, reference numeral 1 is the dashboard arranged in the front portion of a vehicle chamber, reference numeral 2 is a center console, which is arranged at the center of the dashboard 1, for partitioning a driver's seat and an assistant driver's seat, reference numeral 3 is a multi-function switch (operation switch) arranged on a surface (center cluster panel) of the center console 2, reference numeral 4 is a screen display device arranged in an upper portion of the multi-function switch 3 so that a driver can recognize the screen display device when the driver is in a driving posture, and reference numeral 5 is a meter housing on which a speedometer, tachometer and others are arranged.

The dashboard 1 shown in the drawing is of the right steering wheel type. A driver sits on a driver's seat (not shown) arranged at a position opposed to the meter housing 5. The multi-function switch 3 is arranged at a position where the driver can naturally operate the multi-function switch 3 when he sits on the driver's seat and stretches his left hand to the center console 2. In the dashboard of the left steering wheel type, the multi-function switch 3 is arranged at a position where the same effect can be provided. The multi-function switch 3 may be arranged at a position where a user sitting on the assistant driver's seat can operate it in the same manner as that of the driver (the driver is described as the user in this specification, hereinafter).

Figure 2:
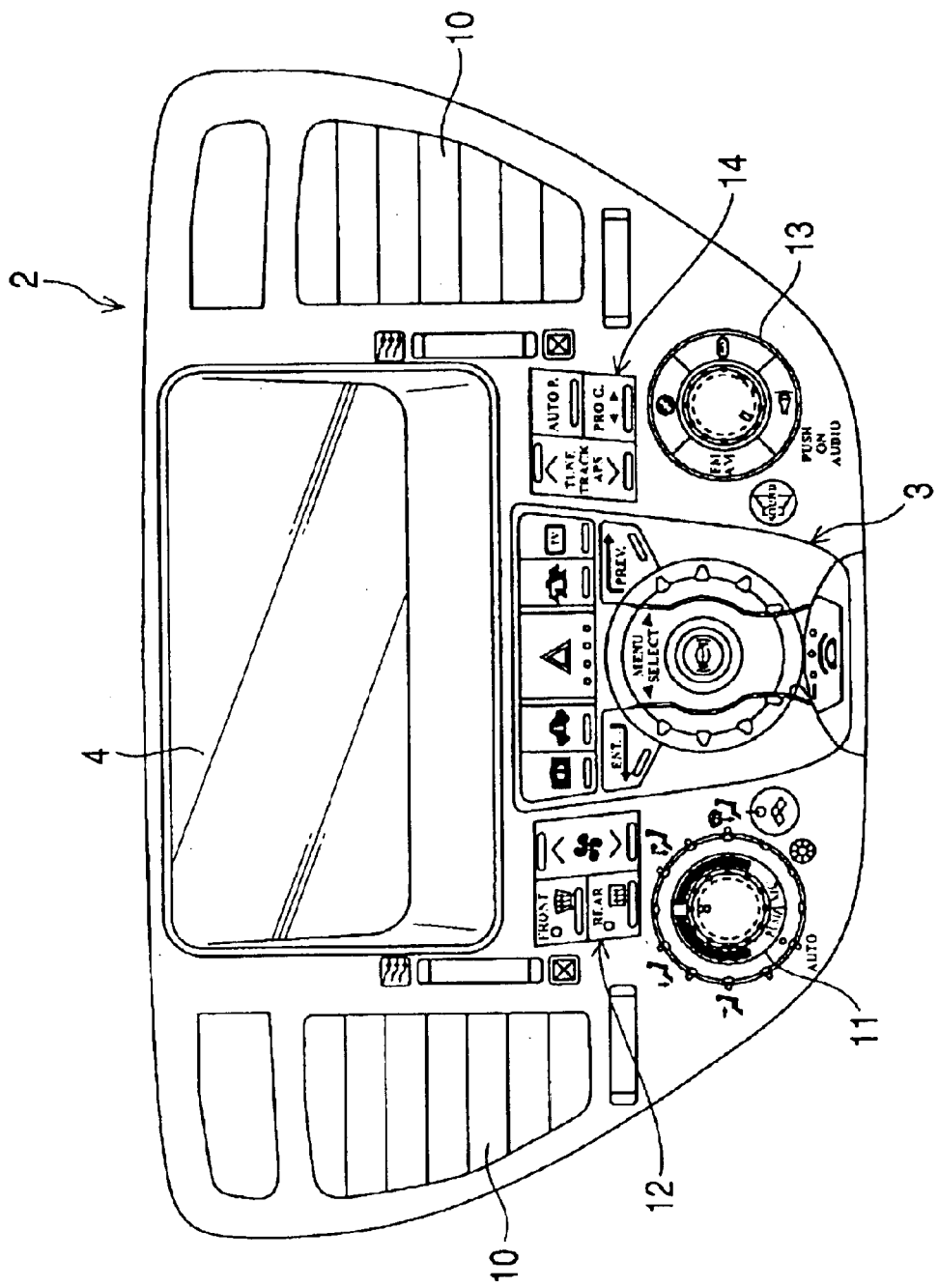
FIG. 2 is a front view showing an outline of a center console 2 of a dashboard according to Embodiment 1 of the present invention.

FIG. 2 is a front view showing an outline of the surface (center cluster panel) of the center console 2 shown in FIG. 1. Like reference characters are used to indicate like parts in FIGS. 1 and 2, and the explanations are omitted here. Reference numeral 10 is an outlet from which air of the air-conditioner is blown out, and reference numeral 11 is an air-conditioner switch for selecting a ventilation duct from a plurality of ducts arranged in the vehicle chamber and also for starting the air-conditioner. Reference numeral 12 is a ventilation setting switch for setting a defrosting function of the rear or the front window screen and adjusting an intensity of blowing air, reference numeral 13 is an audio device selecting switch for selecting and starting one of the audio devices including a traffic information device, radio set, cassette player and CD player, and reference numeral 14 is an audio device adjusting switch for setting and adjusting the audio device described above.

Figure 3A:
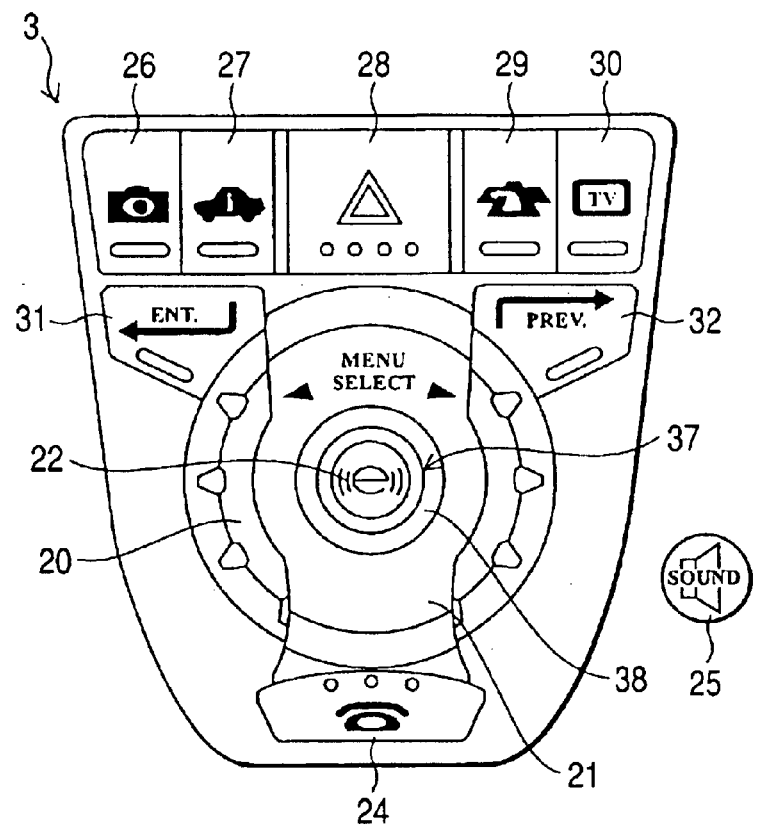
FIGS. 3(A) and 3(B) are a schematic illustration showing a multi-function switch 3 according to Embodiment 1 of the present invention.
Figure 3B:
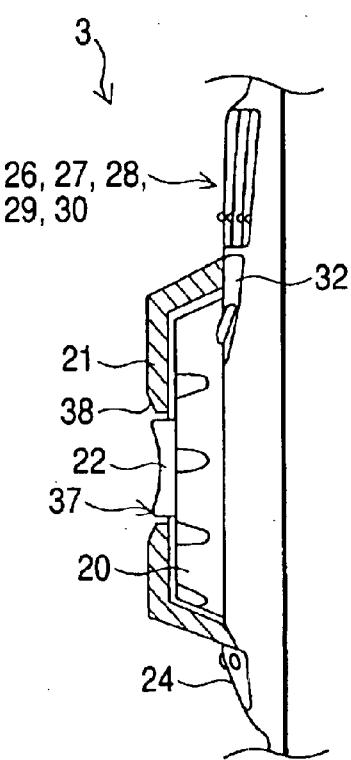

FIGS. 3(A) and 3(B) are views showing a multi-function switch 3 arranged on the surface of the center console 2 shown in FIG. 2. FIG. 3(A) is a front view showing an outline of the multi-function switch 3, and FIG. 3(B) is a side view showing an outline of the multi-function switch 3 in which a longitudinal cross section is shown with respect to the dial cover 21 described later.

In the figure, reference numeral 20 is a dial such as a jog dial, the profile of which is substantially a disk-shape, the rotary central axis of which is arranged in the direction of the normal line with respect to the surface of the multi-function switch 3, and the dial 20 has a feeling of a click when it is rotated. Reference numeral 21 is a dial cover, the longitudinal cross section of which is formed into a substantial C-shape. The dial cover 21 covers an upper portion of the dial 20 when it is attached to the multi-function switch 3. The dial cover 21 has two openings, which are arranged on the sides thereof opposed to each other, and a portion on the outer circumferential side of the dial 20 (and a portion on the upper face of the dial 20), which is rotated by a user with his finger, is protruded from the openings. The dial cover 21 has an insertion hole 37, which is formed on an upper face of the dial cover 21, into which an operation knob of an electronic mail activating switch 22 described later is inserted. The electronic mail activating switch 22 is formed to protrude from an upper face of the dial 20. The dial cover 21 has a recess 38, which is formed around the insertion hole 37, so that a user's finger can reach a predetermined depth of the insertion hole 37 and the finger can be contacted with a circumferential edge of the insertion hole 37.

In this connection, the dial 20 covered with the dial cover 21 can be freely rotated clockwise and counterclockwise. Reference numeral 22 is the electronic mail activating switch protruding from the upper face of the dial 20 at the rotary center of the dial 20 on the upper face of the dial cover 21. This electronic mail activating switch 22 is arranged so that it can not protrude from the upper face of the dial cover 21 when this electronic mail activating switch 22 is inserted into the inserting section 37 of the dial cover 21. Reference numeral 24 is an automobile telephone switch arranged so that it can be contacted with a lower end portion of the dial cover 21. Reference numeral 25 is a sound switch, which is arranged on the right of the dial 20, for setting a voice output of the audio device.

Reference numeral 26 is a switch for starting an optional device. For example, reference numeral 26 is a starting switch for starting a blind monitor by which a rear portion of a vehicle, which is in the dead angle for a user sitting on the driver's seat, can be displayed on the screen display device 4. Reference numeral 27 is a vehicle information switch for displaying pieces of vehicle information which are sent from a trip meter, calendar, multi-meter, clock and display (setting items such as luminance of the screen display device 4) on the screen display device 4. Reference numeral 28 is a hazard switch. Reference numeral 29 is a car navigation starting (displaying) switch. Reference numeral 30 is a television set starting (displaying) switch. Reference numeral 31 is an "Enter" switch operated when a decision is made on a content of the setting to be displayed on the screen display device 4. Reference numeral 32 is a "Previous" switch operated when the screen display device 4 is made to display a previous image. Each switch explained above is a push switch having a pushing mechanism by which the switch is turned on and off when a user presses the switch with his finger. The electronic mail activating switch 22 may be a multidirectional switch such as a joystick, a 2-directional switch, a 4-directional switch, or the like. In addition, the multidirectional switch may be built in the push switch.

The blind monitor starting switch 26, vehicle information switch 27, hazard switch 28, car navigation starting switch 29 and television set starting switch 30 are arranged in this order from the left end to the right end in an upper end surface portion of the multi-function switch 3. In the multi-function switch 3 shown in FIG. 3, the rotary center of the dial 20 and the center of the hazard switch 28 are arranged on a center straight line in a front view in which a user faces and takes a look at the multi-function switch 3. The hazard switch 28 is arranged at the center, and other switches are symmetrically arranged on both sides of the hazard switch 28. "Enter" switch 31 is arranged at a left upper position of the rotary center of the dial 20 between the blind monitor starting switch 26 (and the vehicle information switch 27) and the dial 20. "Previous" switch 32 is arranged at a right upper position of the rotary center of the dial 20 between the car navigation starting switch 29 (and the television set starting switch 30) and the dial 20.

These switches (the blind monitor starting switch 26, vehicle information switch 27, hazard switch 28, car navigation switch 29, television set starting switch 30, "Enter" switch 31, "Previous" switch 32, electronic mail activating switch 22, sound switch 25 and automobile telephone switch 24 are respectively arranged at positions where the user can operate these switches when he puts his hand on the dial cover 21 and stretches his fingers to the switches while the user is taking a stable sitting posture. When consideration is given to improvements in the operation property of the user, it is preferable to arrange the switches in such a manner the switches are arranged around the dial 20 so that the user can naturally operate the switches when he puts his hand on the dial cover 21 while the user's middle finger is being positioned at the hazard switch 28. Further, it is possible to arrange the switches so that the operating portion of the dial 20 can be held by the thumb and annular finger of the user and the switches can be operated by other fingers of the user.

In order to prevent the occurrence of misoperation of the switches, it is necessary to arrange the switches so that a user's hand can not be easily contacted with the switches while a portion of the user's hand, for example, the user's palm is coming into contact with the dial cover 21. An upper end portion of the electronic mail activating switch 22, which is arranged at a position close to the center on the upper face of the dial cover 21, is arranged on the same face as the upper face of the dial cover 21 or is arranged not to protrude from the upper face of the dial cover 21 so that the user can not touch the electronic mail activating switch 22 with his hand when he has no intention of touching it. It is preferable that the upper end portion of the electronic mail activating switch 22 is arranged at a position appropriately lower than the upper face of the dial cover 21 so that the electronic mail activating switch 22 can not be unintentionally pushed down even if the user's hand comes into contact with the upper face of the dial cover 21.

As can be seen in the above explanations, the blind monitor starting switch 26, vehicle information switch 27, hazard switch 28, car navigation switch 29, television set starting switch 30, "Enter" switch 31, "Previous" switch 32, automobile telephone switch 24 and sound switch 25 may be of the push type. Therefore, these switches may be composed of panel switches so as to provide the same effect as that explained before.

Figure 4:
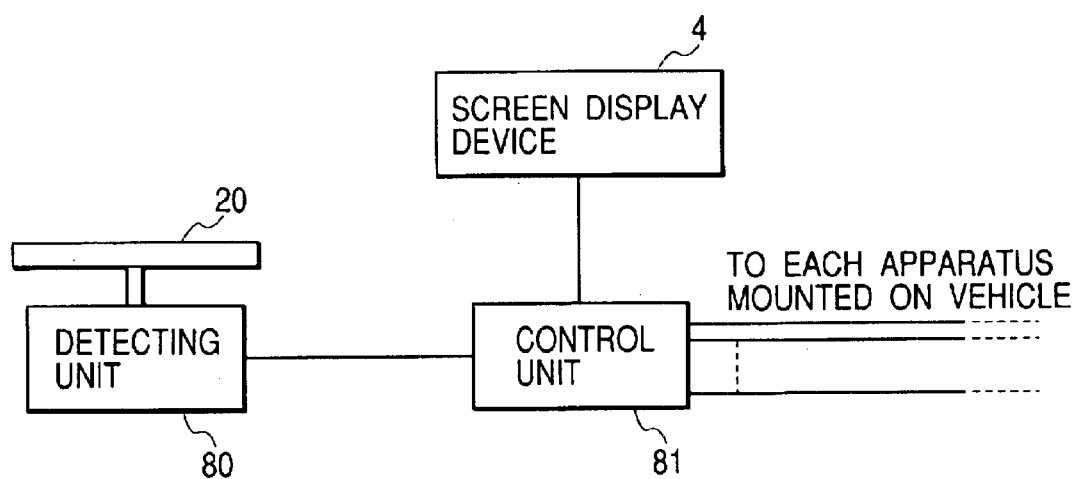
FIG. 4 is a block diagram showing an outline of an electrical arrangement according to Embodiment 1 of the present invention.

FIG. 4 is a block diagram showing an outline of the electrical components for controlling the apparatus mounted on a vehicle according to the operation of the dial 20 including the multi-function switch 3. In the drawing, reference numeral 4 is a screen display device, reference numeral 20 is a dial, and reference numeral 80 is a detecting unit for detecting a direction of rotation and also detecting a quantity of rotation (number of clicks) when the dial 20 is operated. Reference numeral 81 is a control unit for conducting a predetermined setting motion by sending a control signal to each apparatus mounted on a vehicle according to the signal outputted from the detecting unit 80. This control unit 81 makes the screen display device 4 carry out displaying the setting of the apparatus mounted on a vehicle. The detecting unit 80 and the control unit 81 are arranged, for example, on the back side of the center console 2. In this connection, concerning each switch (push switch, multidirectional switch) constructing the multi-function switch 3, the switch signal is inputted into the control unit 81 or the switch signal is directly inputted into the apparatus mounted on a vehicle, so that the apparatus mounted on a vehicle (and the screen display device 4) can be controlled by the control unit 81 or the apparatus mounted on a vehicle can be directly controlled by the signal. Each of switches is not shown in FIG. 4.

Next, operation will be explained below.

Figure 5A:
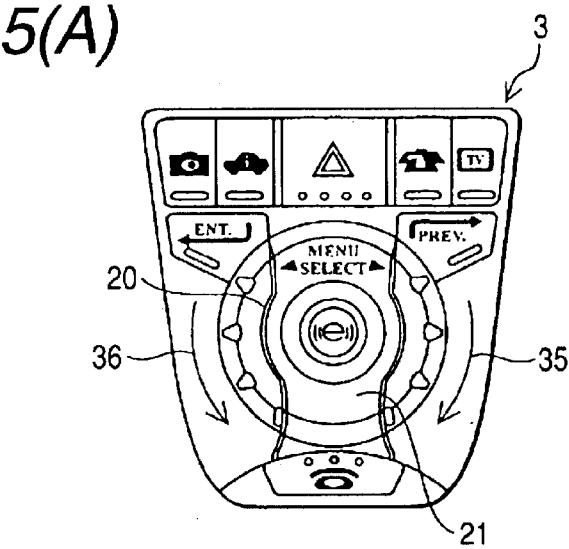
FIGS. 5(A) and 5(B) are a schematic illustration showing a displayed screen according to Embodiment 1 of the present invention.
Figure 5B:
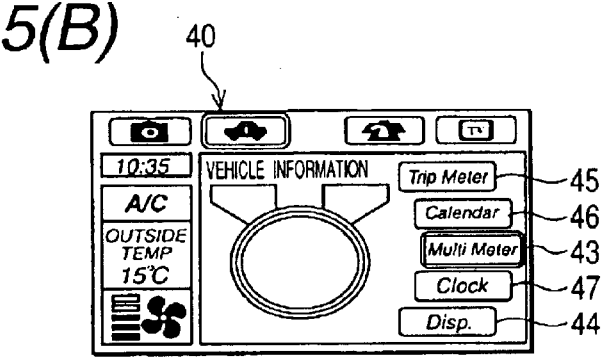
Figure 5B:
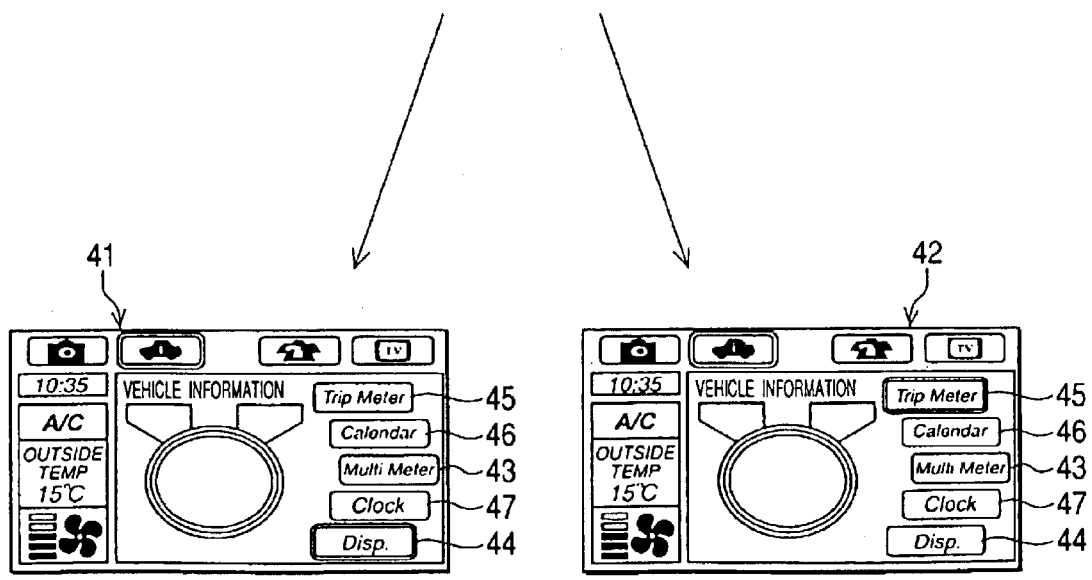

FIGS. 5(A) and 5(B) are schematic illustrations showing an example of the screen shown on the screen display device 4 by operating the dial 20 of the multi-function switch 3. FIG. 5(A) is a schematic illustration showing a direction of rotation in the case where the dial 20 of the multi-function switch 3 is operated. In the drawing, reference numeral 35 is an arrow showing that the dial 20 is rotated right, and reference numeral 36 is an arrow showing that the dial 20 is rotated left. FIG. 5(B) is a schematic illustration showing an example of the screen transition for selecting items to be displayed with respect to vehicle information. In the drawing, reference numerals 40 to 42 are display screens, and reference numerals 43 to 47 are frames encircling the names of the items displayed on the screens.

When the user operates the vehicle information switch 27 shown in FIG. 3(A), as shown in FIG. 5(B), the screen display device 4 displays "Trip Meter", "Calendar", "Multi-meter", "Clock" and "Display (Disp.)" which are provided as vehicle information. These pieces of vehicle information are longitudinally displayed on the screen as the icons list. A desired item, namely icon, is selected from the above icons list by operating the dial 20. In the drawing, the selected icon is encircled by a bold line frame, however, in the actual operation, the selected icon may be expressed by a color different from the colors of the other icons.

For example, in the case where the user wants to select the icon of "Display", first, the dial 20 is rotated in the direction of the arrow 35 by two clicks from the state in which the frame 43 of "Multi-meter" is selected on the screen 40. Due to the above operation, the frame 44 of the icon of "Display" is selected and displayed as shown on the screen 41. In order to decide that "Display" has been selected, the "Enter" switch 31, as shown in FIG. 3(A), is operated. When the dial 20 is rotated in the direction of the arrow 35 by three clicks from the state of the screen 40, the bold frame display, which indicates a selected icon, is moved to the icon (frame 45) of "Tip Meter" on the screen 42 via the icon (frame 47) of "Clock" and the item (frame 44) of "Display".

In the case where the dial 20 is rotated in the direction of the arrow 36 by two clicks from the state in which the icon (frame 43) of "Multi-meter" is selected on the screen 40, the display of the frame of the selected item is moved to the item (frame 45) of "Trip Meter" on the screen 42. When the dial 20 is rotated in the direction of the arrow 36 by three clicks from the state of the screen 40 (state in which the frame 43 is selected), the display of the frame of the selected item is moved to the item (frame 44) of "Display" on the screen 41 via the item (frame 46) of "Calendar" and the item (frame 45) of "Trip Meter".

On the display screens 40, 41 and 42, exemplarily shown in this Embodiment 1, the name display of each item stays stationary at a predetermined position, and the bold frame showing that the item has been selected is moved.

As described above, according to this Embodiment 1, it is possible for the user to operate each switch in a stable posture while the user is touching the dial cover 21 with his hand.

When the dial 20 is covered with the dial cover 21, it is possible to provide an effect of preventing the occurrence of misoperation by a simple mechanism, the manufacturing cost of which is low, without using a complicated mechanism to prevent the occurrence of misoperation.

Further, it is possible for the user to operate the dial 20 and push switches 26 to 32 while the user is touching the dial cover 21 with his hand. Therefore, it is possible to provide an effect of preventing the occurrence of misoperation of the dial 20 and push switches 26 to 32.

Since the recess portion 38 is provided in the periphery of the opening of the insertion hole 37 formed on the upper face of the dial cover 21, it is possible to prevent for the user to easily touch the electronic mail activating switch 22 while the user is touching the dial cover 21 with his hand. Accordingly, it is possible to provide an effect of preventing the occurrence of misoperation.

The plurality of push switches 26 to 32 are arranged so that the user can operate them while the user is touching the dial cover 21 with a portion of his hand such as his palm. Therefore, the user can operate the push switches 26 to 32 without greatly moving his hand while his posture is being stabilized by putting his hand on the dial cover 21.

The plurality of push switches 26 to 32 are arranged in the horizontal direction symmetrically to each other with respect to the dial 20 and dial cover 21. Therefore, all fingers of one hand of the user can be effectively used for operation.

When the push switches 26 to 32 are formed of panel switches, it becomes possible to reduce the number of protrusions on the dashboard 1. Therefore, the beauty of the vehicle chamber can be enhanced.

The item to be selected on the display screen is expressed by a bold frame or a color different from that of the surroundings. Therefore, the selecting operation can be conducted by the user with the dial 20 while the user is making sure of the screen.

Embodiment 2

Figure 6:
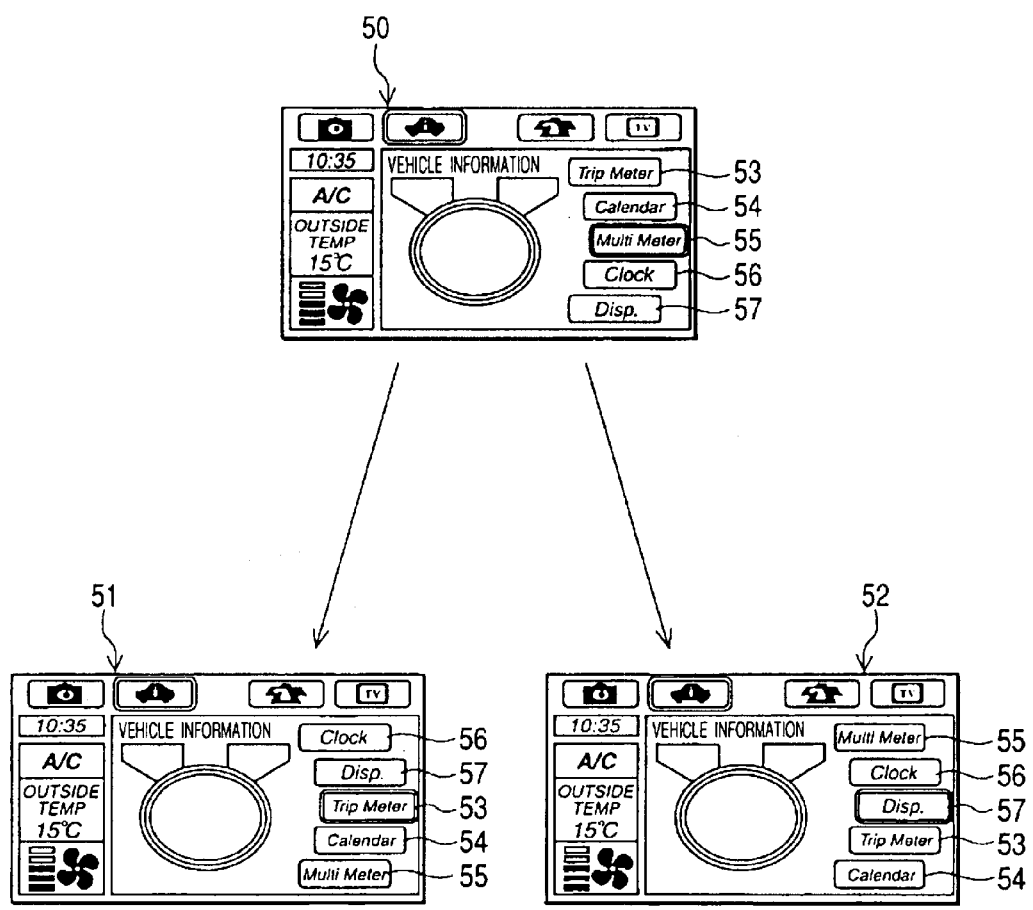

FIG. 6 is a schematic illustration of Embodiment 2 (screen displayed on the screen display device 4) in which screen transition to select an item of vehicle information is shown in the same manner as that of Embodiment 1. In the drawing, reference numerals 50 to 52 are screens displayed on the screen display device 4, and reference numerals 53 to 57 are frames encircling the item name displayed on the screen. On the screens 50 to 52, the frames of the items are displayed being arranged in the longitudinal direction. In this connection, the structure of the multi-function switch 3, which has been explained referring to FIGS. 1 to 3, is the same, and like reference characters are used to indicate like parts in the following explanations.

Next, operation will be explained below.

In the same manner as that of Embodiment 1, in this Embodiment 2, the item encircled by the bold frame is selected. However, unlike Embodiment 1, the displayed bold frame is not moved on the screen, but displayed at a predetermined position being kept stationary. In this case, explanations will be made into an example in which the item encircled by the bold frame is displayed at the center of the items arranged in the longitudinal direction. On the display screen, five frames expressing the items are arranged in the longitudinal direction. In this connection, as long as the same effect can be provided, the position at which the bold frame is displayed is not limited to the above specific embodiment.

First of all, on the screen 50, the frame 53 of the item of "Multi Meter" is encircled by the bold frame and displayed at the center of the frames of the items arranged in the longitudinal direction, that is, the item of "Multi Meter" is selected. In the above condition, the frame 53 of the item of "Trip Meter", the frame 54 of the item "Calendar", frame 55 of the item "Multi Meter", frame 56 of the item "Clock" and frame 57 of the item "Display" are arranged in the longitudinal direction from top to bottom on the screen.

When the dial 20 is rotated in the direction of the arrow 35 (shown in FIG. 5(A)) by two clicks while the above screen 50 is being displayed, the frame of each item is moved upward together with the item name display as shown on the screen 51. Therefore, the items which can not be displayed by screen information go downward and are displayed in the longitudinal direction. Specifically, when the dial 20 is rotated by two clicks in the direction of the arrow 35, the frame 53 of the item "Trip Meter", which was displayed at the uppermost portion on the screen 50, is moved to a position lower by two steps on the screen 51. Accordingly, the frame 54 of the item "Claendar" and the frame 55 of the item "Multi Meter" are also moved to positions lower by two steps on the screen 51. Due to the foregoing, the frame 55 of the item "Multi Meter" is displayed in the lowermost portion on the screen 51. The frame 56 of the item "Clock" and the frame 57 of the item "Display", which were displayed in the lower portion of the frame 55 of the item "Multi Meter", are successively moved upward on the screen. Therefore, the frame 56 of the item "Clock" and the frame 57 of the item "Display" are displayed from top to bottom in this order on the screen 51. Therefore, the frame 53 of the item "Trip Meter" is displayed at the center of the items arranged in the longitudinal direction. Since the frame 53 of the item "Trip Meter" is displayed at this position, the frame 53 is encircled by the bold frame and selected.

Next, explanations will be made into a case in which the dial 20 is rotated by three clicks in the direction of the arrow 35 on the screen 50. The frame 57 of the item "Display", which was displayed in the lowermost portion on the screen 50, is moved to a position lower by three steps. Therefore, at first, the frame 57 of the item "Display" is moved to the uppermost portion on the screen and then moved to a position lower by two steps from there. Due to the above movement, as shown on the screen 52, the frame 57 of the item "Display" is moved to the center of the frames of the items which are arranged in the longitudinal direction. The frames of the other items are also displayed as shown on the screen 52 in the same manner as that described above.

When the dial 20 is rotated in the direction of the arrow 36 by two clicks in the state of the screen 50, the frame 55 of the item "Multi-meter", which was encircled by the bold frame on the screen 50 so that the item "Multi Meter" could be made to be a selected item, is moved upward on the screen by two steps and displayed in the uppermost portion on the screen as shown on the screen 52. The frame 57 of the item "Display", which was displayed in the lowermost portion on the screen 50, is moved upward by two steps and displayed on the screen 52 being encircled by the bold frame. Therefore, "Display" becomes a selected item. At this time, the frame 53 of the item "Trip Meter", which was displayed in the uppermost portion on the screen 50, is moved downward to the lowermost portion on the screen and further moved upward by one step. The other items are moved upward by two steps on the screen in the same manner explained above.

When the dial 20 is rotated in the direction of the arrow 36 by three clicks in the state of the screen 50, the frame 53 of the item "Trip Meter", which was displayed in the uppermost portion on the screen 50, is moved downward on the screen and further moved upward by two steps and encircled by the bold frame as shown on the screen 51. Therefore, "Trip Meter" becomes a selected item.

As explained above, according to this Embodiment 2, the bold frame is displayed at a predetermined position on the display screen, and the selected item name is moved so that it can be displayed in this bold frame. Therefore, when the user watches this bold frame, it is possible for the user to select a desired item without moving his eye.

Embodiment 3

Explanations will be made into Embodiment 3 as follows in which the screen is displayed and the multi-function switch 3 is operated in the same manner as that explained in Embodiment 1.

Figure 7:
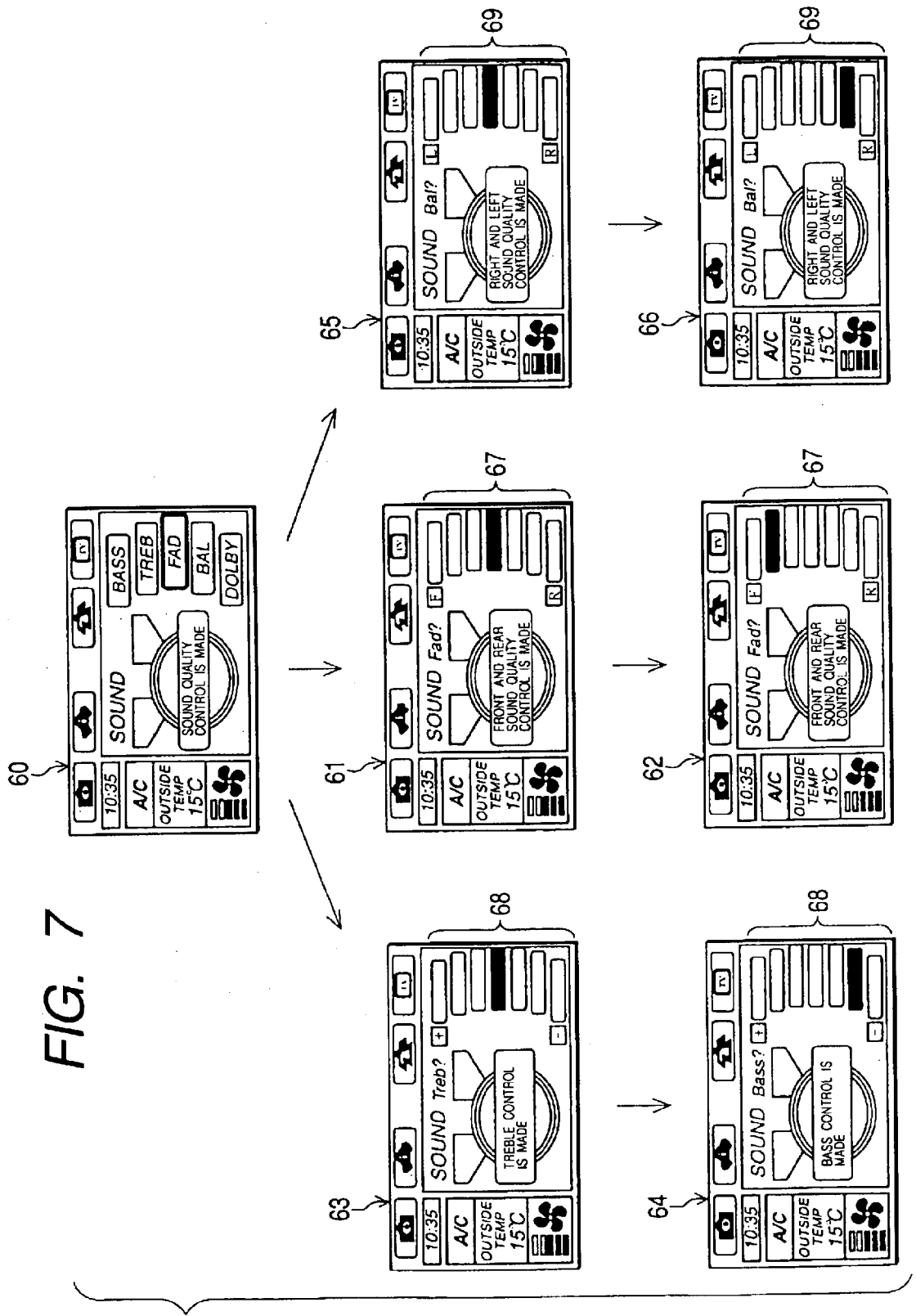
FIG. 7 is a schematic illustration showing a display screen according to Embodiment 3 of the present invention.
Figure 8:
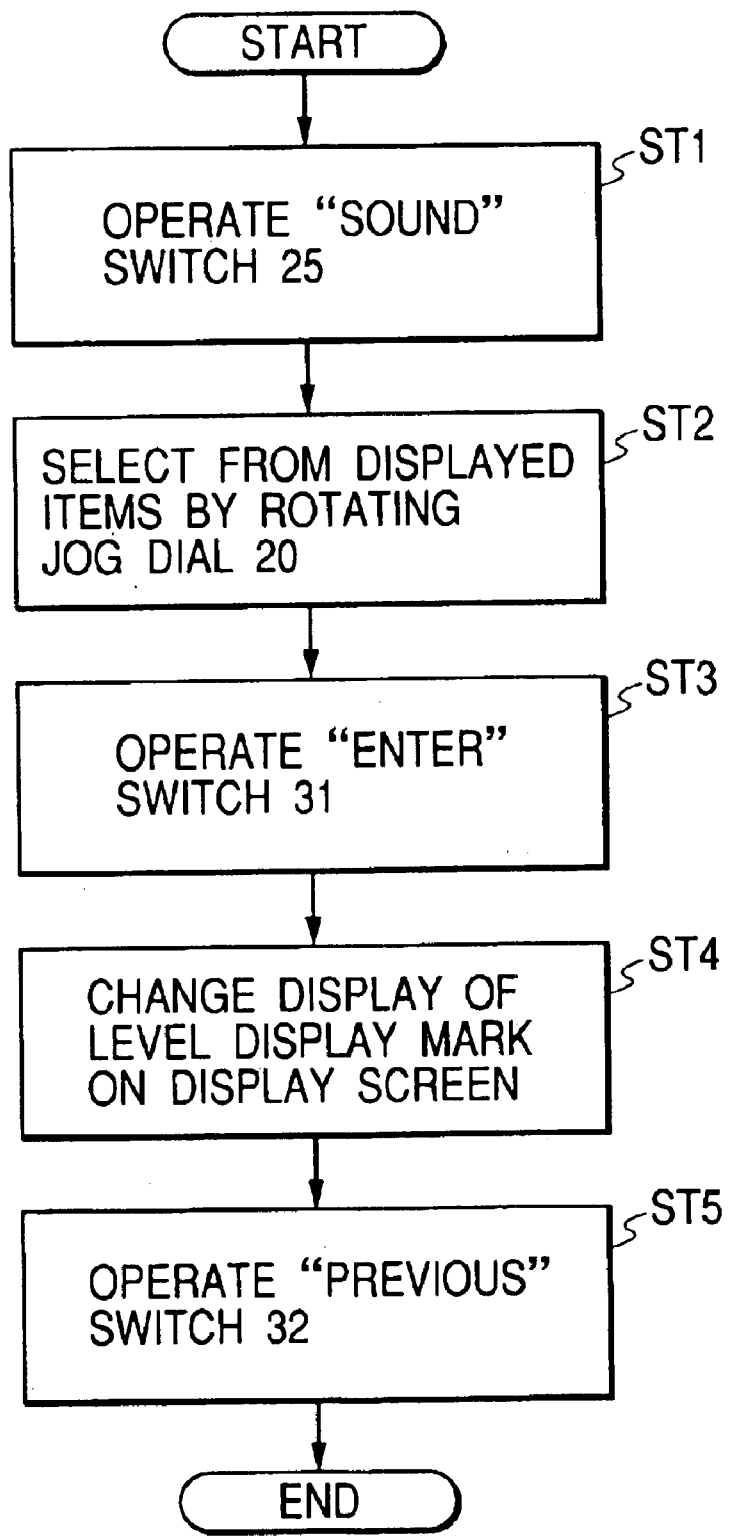
FIG. 8 is a flow chart showing operation conducted according to Embodiment 3 of the present invention.

In this Embodiment 3, the setting of sound (audio output) is taken up as an example and explained below. FIG. 7 is a schematic illustration showing each setting screen displayed on the screen display device 4. In the drawing, reference numerals 60 to 66 are display screens displayed on the screen display device 4, reference numeral 67 is a level display mark displayed on the screens 61, 62, reference numeral 68 is a level display mark displayed on the screens 63, 64, and reference numeral 69 is a level display mark displayed on the screens 65, 66. FIG. 8 is a flow chart showing operation conducted by the user with the multi-function switch 3. In this connection, in this Embodiment 3, the setting operation conducted with the multi-function switch 3, which is explained in Embodiment 1, is explained in detail. Therefore, the arrangement of each switch is the same as that explained in Embodiment 1, and like reference characters are used to indicate like parts, and explanations are omitted here.

Next, operation will be explained below.

The screen 60 is an audio output setting screen which is obtained when the previous display screen (essential screen) is switched by the user pressing the sound switch 25 shown in FIG. 3(A) (step ST1). The user rotates the dial 20 and selects items to set the level, balance and ON and OFF of sound signal processing from "BASS", "TREB", "Sound volume of front and rear (FAD)", "Sound volume of right and left (BAL)" and "DOLBY" which are displayed on the right of the screen 60 in the longitudinal direction (step ST2).

On the screen 60, the item of "Sound volume of front and rear (FAD)" is encircled and selected by the bold frame. When the user presses "Enter" switch 31 shown in FIG. 3(A) (step ST3), the display is changed to the screen 61. On the right of the screen 61, there are provided level displaying marks 67 composed of a plurality of marks displayed in the longitudinal direction. When light is emitted from the level displaying mark displayed in an upper portion or when the level displaying mark displayed in an upper portion is displayed by a predetermined color, the setting is conducted in such a manner that sound volume of the speaker arranged in the front portion of the vehicle is increased. When light is emitted from the level displaying mark displayed in a lower portion, the setting is conducted in such a manner that sound volume of the speaker arranged in the rear portion of the vehicle is increased. On the screen 61, light is emitted from a mark arranged at the center of the frames which are aligned in the longitudinal direction, which shows that sound volume of the front speaker and that of the rear speaker are well balanced. This is the standard setting.

In the case where the user adjusts to increase sound volume of the front speaker, the dial 20 of the multi-function switch 3 is rotated counterclockwise in the direction of the arrow 36 shown in FIG. 5(A) (step ST4). For example, when the dial 20 is rotated counterclockwise by two clicks in the state shown on the screen 60, light is emitted from a mark located at a position, which is higher by two steps with respect to the mark shown on the screen 60, as shown on the screen 62. When the dial 20 is rotated clockwise in the direction of the arrow 35 in FIG. 5(A), a light emitting mark is moved downward according to a quantity of rotation (number of clicks), and the sound volume of the rear speaker can be increased. After that, when the user presses "Previous" switch 32 of the multi-function switch 3 (step ST5), each setting becomes valid. Therefore, according to operation of the multi-function switch 3, the control unit 81 sends control signals to the related apparatus mounted on the vehicle, and the setting is conducted on the apparatus mounted on the vehicle with respect to each item.

Explanations are made above into a case in which the item to adjust sound volume of the front and the rear speaker is selected. When the dial 20 of the multi-function switch 3 is rotated counterclockwise by one click in the state shown on the screen 60, the item, which is encircled by the bold frame, for setting "TREB" is selected. When "Enter" switch 31 of the multi-function switch 3 is pressed, the display is changed to the screen 63 on which a sound volume level in the high frequency region is adjusted. On the right of the screen 63, there are provided level display marks 68 composed of a plurality of marks, which are arranged in the longitudinal direction, showing sound volume in the high frequency region. These level display marks 68 shows that when the light emitting mark (or the mark displayed by a predetermined color) is directed from bottom to top, the sound volume setting is conducted so that the sound volume can be increased. On the screen 63, a mark located at the center of the marks arranged in the longitudinal direction emits light, which shows that the setting of sound volume is in the standard state.

For example, when the user adjusts to reduce sound volume in the high frequency region, the dial 20 is rotated clockwise. When the dial 20 is rotated by two clicks in the state shown on the screen 63, the screen is changed to the screen 64, and the display of the level display mark 68 is moved to the mark located at a position lower than the light emitting mark on the screen 63 by two steps. When the user adjusts to increase sound volume in the high frequency region, the dial 20 is rotated counterclockwise. Due to the foregoing, the light emitting mark of the level display marks 68 is moved upward on the screen according to the number of clicks, and sound volume in the high frequency region is increased with respect to the apparatus concerned.

Next, explanations will be made into a case in which the user rotates the dial 20 counterclockwise by one click in the state shown on the screen 60. The item (selected item) encircled by the bold frame is changed to the item "Balance (BAL)", which was displayed at a position lower by one step on the screen, from "Sound volume of front and rear (FAD)". When the user presses "Enter" switch 31, the display is changed to the screen 65. On the right of the screen 65, there are provided level display marks 69 composed of a plurality of marks displayed in the longitudinal direction. When the light emitting mark (or the mark displayed by a predetermined color) is directed upward on the screen, sound volume in the right channel is increased, and when the light emitting mark (or the mark displayed by a predetermined color) is directed downward on the screen, sound volume in the left channel is increased.

In the drawing, the screen 65 shows the standard setting in which the mark located at the center of marks arranged in the longitudinal direction emits light and sound volume in the right channel and that in the left channel are the same. When the user wants to increase sound volume, for example, in the right channel in the above state, the dial 20 is rotated clockwise. In the case where the dial 20 is rotated by two clicks in the state shown on the screen 65, the screen is changed to the screen 66, and the display of the level display mark 69 is moved from the mark emitting light on the screen 65 to the mark located at a position lower by two steps. When the user wants to increase sound volume in the left channel in the above state, the dial 20 is rotated counterclockwise. Due to the foregoing, the light emitting mark in the level display mark 69 is moved upward on the screen according to the number of clicks. Therefore, sound volume of the left channel of each apparatus concerned is increased.

The setting operation in which the dial 20 is used is explained above with respect to the items of "Sound volume in the front and the rear channel", "TREB" and "Sound volume in the right and the left channel". After the setting of each item (operation on the screens 62, 64 and 65) has been completed, when "Previous" switch 32 of the multi-function switch 3 is pressed, each setting becomes valid. Therefore, the control unit, which has detected operation of the multi-function switch 3, sends control signals to the apparatus concerned, so that the apparatus can be appropriately set.

In this case, the items "Sound volume in the front and the rear channel", "TREB" and "Sound volume in the right and the left channel" are explained above. However, when the dial 20 is rotated while the screen 60 is being displayed, the items "BASS" and "DOLBY" are selected, and the predetermined setting can be conducted on each item when the same operation as that described above is conducted. In this connection, on the screen 60 explained above, the selected item may be displayed in the same manner as that explained in Embodiment 2.

As explained above, according to Embodiment 3, it is possible for the user to adjust a quantity of operation of the dial while the user is making sure of the dial operation on the displayed screen.

Embodiment 4

Next, Embodiment 4, which is based on Embodiment 1 described before, will be explained below. In this Embodiment 4, the setting of time of "Clock" is taken up as an example and explained as follows.

Figure 9:
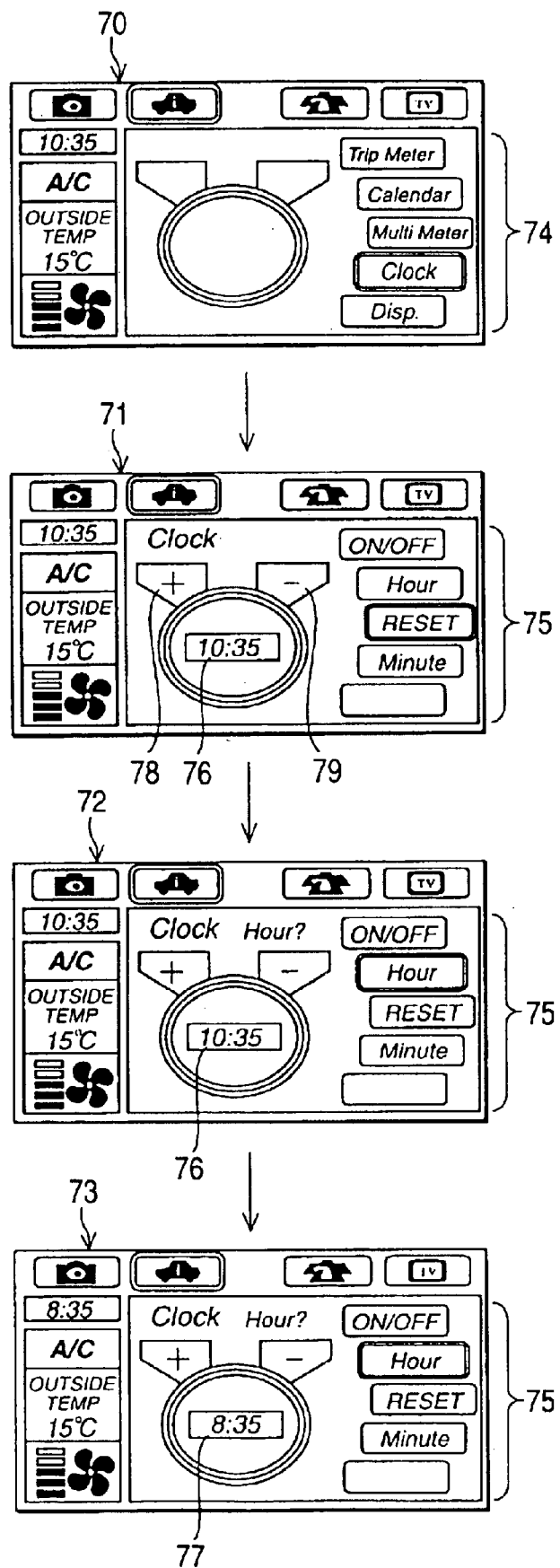
FIG. 9 is a schematic illustration showing a display screen according to Embodiment 4 of the present invention.

FIG. 9 is a schematic illustration showing transition of the screen displayed on the screen display device 4 when the multi-function switch 3 is operated. In the drawing, reference numerals 70, 71, 72 and 73 are screens displayed on the screen display device, reference numeral 74 is a plurality of frames encircling the item names displayed on the screen 70 in the longitudinal direction, reference numeral 75 is a plurality of frames encircling the item names displayed on the screens 71, 72 in the longitudinal direction, reference numeral 76 is a time displaying item displayed on the screens 71, 72, and reference numeral 77 is a time displaying item of "Clock" displayed on the screen 73. Reference numeral 78 is a displaying mark for falsely displaying "Enter switch" 31 arranged in the multi-function switch 3. Mark "+", which expresses that the display of time is made to proceed when "Enter" switch 31 is pressed, is attached to the multi-function switch 3. Reference numeral 79 is a displaying mark for falsely displaying "Previous" switch 32. Mark "−", which expresses that the display of time is made to delay when "Previous" switch 32 is pressed, is attached to the multi-function switch 3. As shown in the drawing, when the displaying marks 78 and 79 are respectively arranged in the traverse direction and a substantial circle is displayed at a position close to the center, "Enter" switch 31, "Previous" switch 32 and the dial 20 are falsely displayed.

Figure 10:
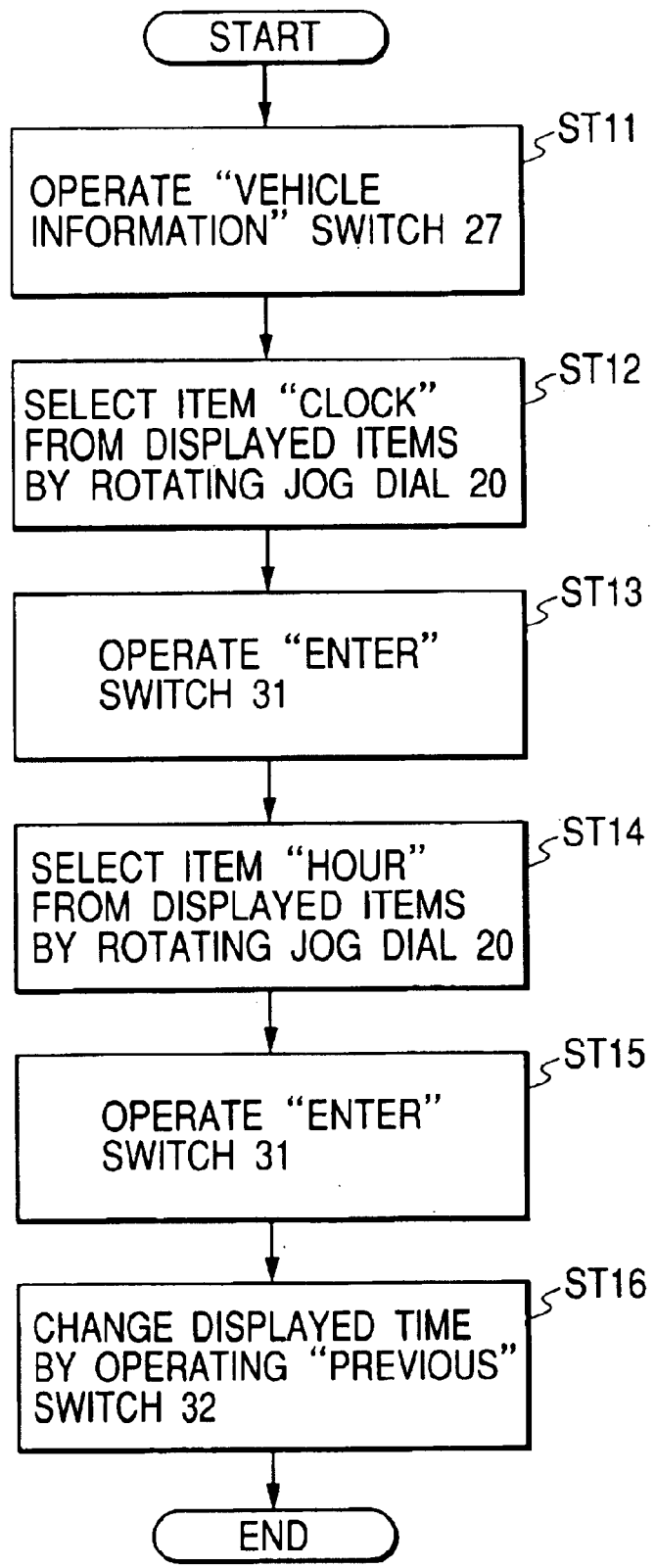
FIG. 10 is a flow chart showing operation conducted according to Embodiment 4 of the present invention.
Figure 11:
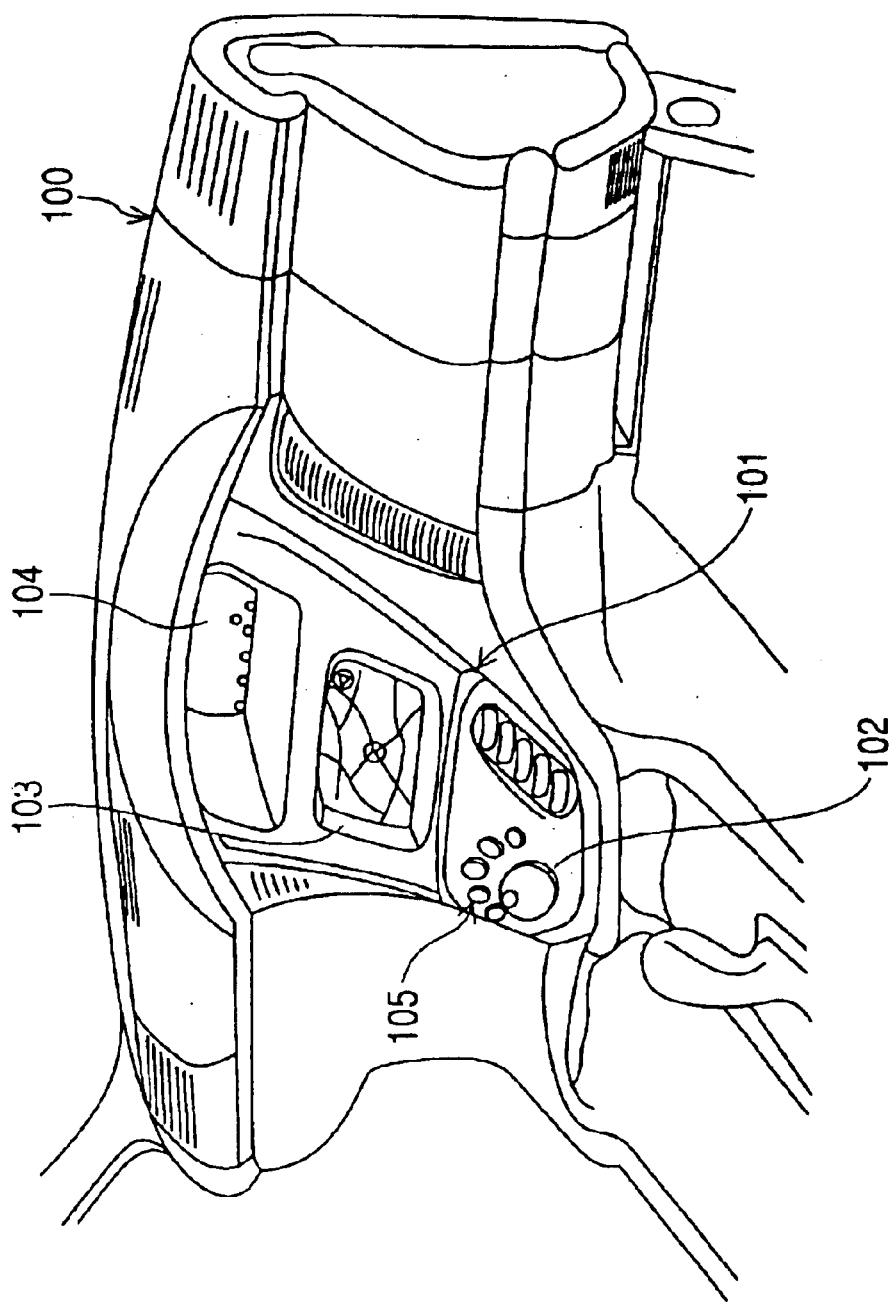
FIG. 11 is a perspective view showing a periphery of a driver's seat of a conventional vehicle.

FIG. 10 is a flow chart showing operation conducted by the user with the multi-function switch 3. In this connection, in this Embodiment 4, the setting operation conducted with the multi-function switch 3, which is explained in Embodiment 1, is explained in detail. Therefore, the arrangement of each switch is the same as that explained in Embodiment 1, and like reference characters are used to indicate like parts, and explanations are omitted here.

Next, operation will be explained below.

When the user presses the vehicle information switch 27 (shown in FIG. 3(A)) of the multi-function switch 3 (step ST11), the screen 70 shown in FIG. 9 is displayed on the image display device 4. On the right of the screen 70, there are provided item names of "Trip Meter", "Calendar", "Multi Meter", "Clock" and "Display (Disp.)" which are arranged in the longitudinal direction from top to bottom in this order. The frames 74 respectively encircling these names are displayed. Concerning "Clock", in the case where the displayed time is revised or changed, the dial 20 is rotated so that the frame 74 of the item "Clock" can be encircled by the bold frame (step ST12), and then "Enter" switch 31 is pressed (step ST13). Then, the display is changed from the screen 70 to the screen 71. On the right of the screen 71, the items of the names of "ON/OFF", "Hour", "Reset" and "Minute" are displayed in the longitudinal direction from top to bottom in this order, and the frames 75 encircling these names are displayed. At a position close to the center of the screen 71, the time displaying column 76 for displaying the time is arranged.

For example, explanations will be made into a case in which the user wants to change the presently displayed time to the time delayed by two hours. As explained above, when the display is changed from the screen 70 to the screen 71, the item "Reset" on the screen 71 is displayed being encircled by the bold frame. At this time, in order to select the item "Hour", the user rotates the dial 20 counterclockwise by one click. Due to the above operation, the item "Hour" is displayed by the bold frame as shown on the screen 72, that is, the item "Hour" is selected (step ST14). After that, the user presses the "Enter" switch 31 (step ST15), and a portion of the displayed time to be changed is turned on and off. In order to delay this displayed portion, which is turning on and off, by two hours, the "Previous" switch 32 of the multi-function switch 3 is pressed twice (step ST16). In this case, when the "Previous" switch 32 of the multi-function switch 3 is pressed once, the display of time is changed by one hour.

Due to the above operation, "10:35" in the time display column 76 on the screen 72 is changed to "8:35" shown in the time display column 77 on the screen 73. Operation to delay the time by the unit of one hour is explained above. In order to advance the time by the unit of one hour, the item "Hour" is selected while the screen 72 is being displayed, the "Enter" switch 31 of the multi-function switch 3 is pressed. In this case, when the "Enter" switch 31 of the multi-function switch 3 is pressed once, the display of time is advanced by one hour.

In order to change the display of time by the unit of a minute, when the screen 72 is displayed, the item "Minute" is selected instead of the item "Hour". When the displayed time is advanced, the "Enter" switch 31 is pressed. When the displayed time is delayed, the "Previous" switch 32 is pressed. In any case, when the switch is pressed once, the displayed time is changed by one minute.

In this connection, when a predetermined period of time has passed after the completion of operation of changing the time, the screen on which the displayed time is changed is automatically switched to a basic screen, for example, the screen of car navigation which has previously been set. Alternatively, when the another switch is operated until the predetermined period of time has passed, the displayed screen is switched to a screen corresponding to the switch.

As explained above, according to Embodiment 4, the arrangements of the dial 20 and the plurality of push switches 26 to 32 and the functions of setting the apparatus mounted on a vehicle corresponding to the push switches 26 to 32 are displayed on the screen display device. Therefore, it is possible for the user to operate a switch while the user is making sure of the switch to be operated on the screen.

Embodiment 5

Figure 12A:
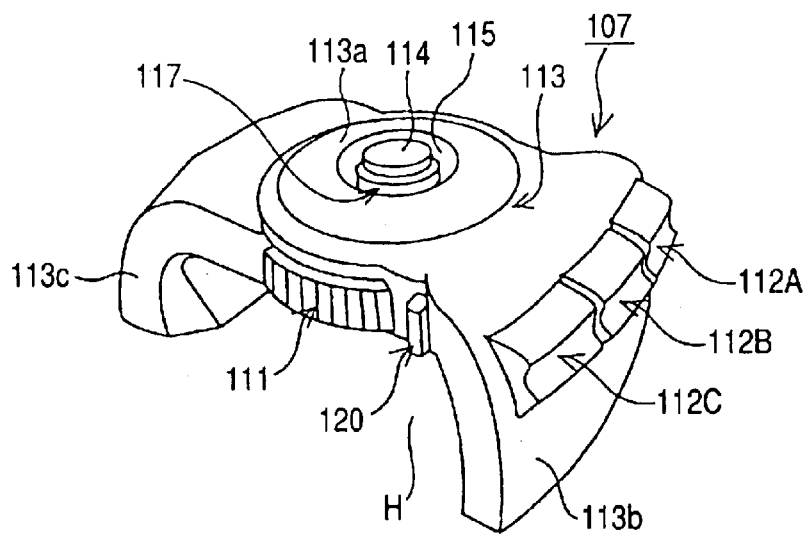
FIGS. 12(A), 12(B) and 12(C) are a perspective view, a plan view, and a side view each showing the main input device according to Embodiment 5 of the present invention.
Figure 12B:
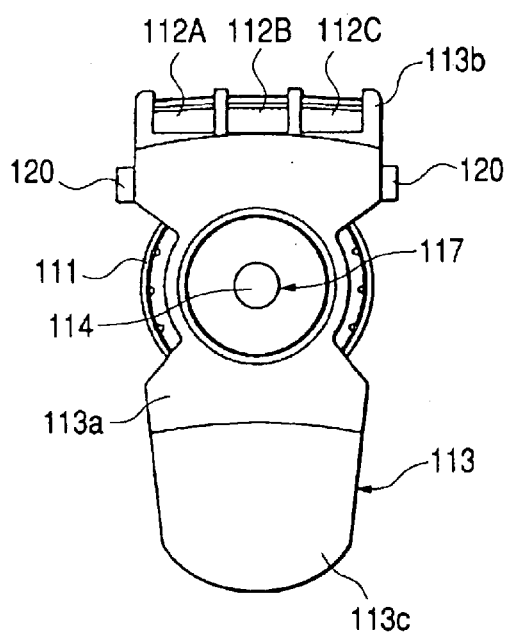
Figure 12C:
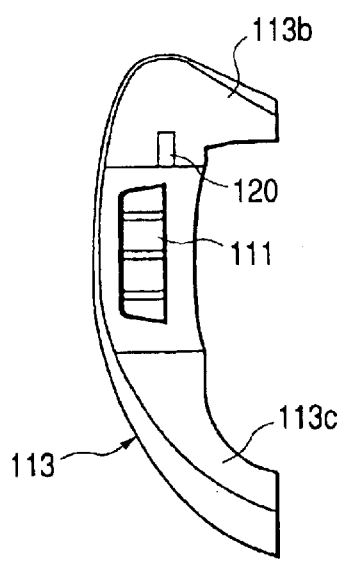

FIG. 12(A) is a perspective view of the main input device 107, which is modification of the multi-function switch 3. FIG. 12(B) is a plan view of the main input device 107. FIG. 12(C) is a side view of the main input device 107.

In the drawing, reference numeral 111 is a dial such as a jog dial horizontally rotating with respect to an upper face of end of the armrest on which the main input device 107 is arranged. Reference numerals 112A, 112B and 112C are operation switches of the seesaw type which are arranged on the side surface of the main input device 107, that is, on the outside of one 113b of the leg portions arranged on the upper face of the armrest in the substantially perpendicular direction.

Figure 13:
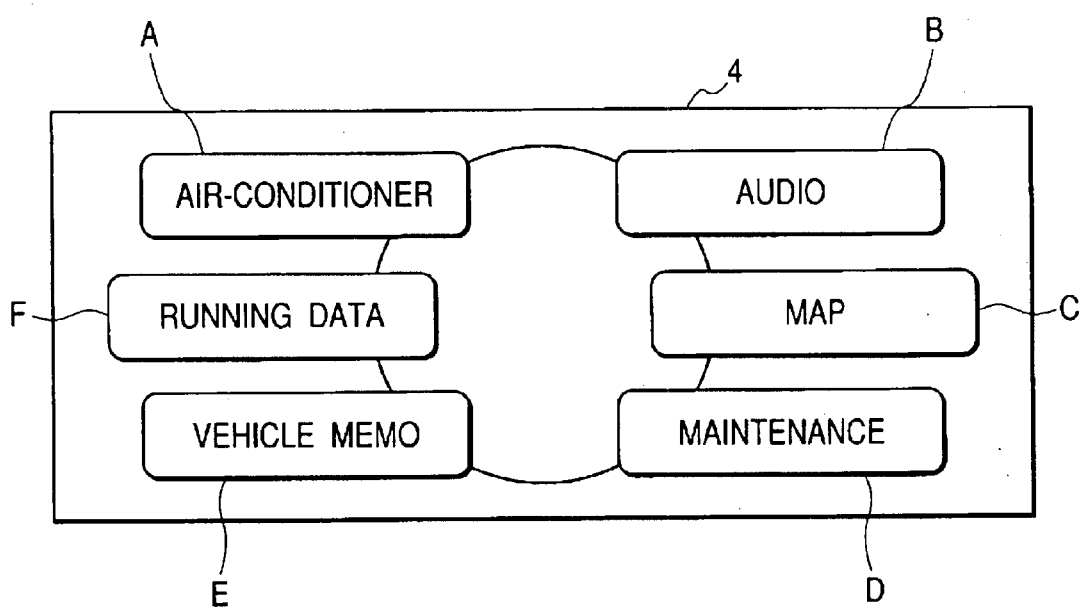
FIG. 13 is a schematic illustration showing a display screen of the screen display device according to Embodiment 5 of the present invention.

As shown in FIG. 13, on the screen of the screen display device 4, icons (indexes or items) A to F on the menu screen for selecting the apparatus mounted on a vehicle are arranged being formed into an ellipse, the major axis of which is arranged in the traverse direction. This screen is displayed as a first hierarchical screen. These icons A to F are arranged being formed into a circle, which associates a rotary operating motion of the dial 111.

When the dial 111 is rotated while icons A to F, which are the first hierarchical screen, are being displayed, the cursor is moved on icons A to F in such a manner that the cursor draws a circle, and when one of the pair of Enter switches 120 is turned on, the function corresponding to the icon A to F is selected. That is, one of the functions of "Air-conditioner" A, "Audio" B, "Map" C, "Maintenance" D, "Vehicle Memo" E and "Running Data" F is selected.

The operation switches 112A, 112B and 112C are function selecting switches for conducting the selecting operation on the second hierarchical screen which is displayed when the Enter switch 120 is turned on while the first hierarchical screen (shown in FIG. 13) to be operated by the dial 111 is being displayed.

These operation switches 112A, 112B and 112C are arranged on a substantially vertical face formed at the front edge of the body case 113. When the user holds the body case 113 with his left palm, the user's thumb naturally comes into contact with the dial 111 protruding from the side of the main input device 107, and the user's forefinger comes into contact with the operation switch 112C and the user's middle finger comes into contact with the operation switch 112B and the user's ring finger comes into contact with the operation switch 112A. At the same time, the user grasps the main input device 107 with his palm. Therefore, it is possible for the user to positively operate the operation switches 112A, 112B and 112C with all his fingers but little finger.

These operation switches 112A, 112B and 112C are allotted to objects to be controlled as follows. The operation switch 112C to be operated by the forefinger is allotted to a controlled object which is used most frequently. The operation switch 112B to be operated by the middle finger is allotted to a controlled object which is used secondly most frequently. The operation switch 112A to be operated by the ring finger is allotted to a controlled object which is used thirdly most frequently. Due to the foregoing, the operation property is increased.

Reference numeral 113 is a body case of the main input device 107. The body case 113 includes: a palm support portion 113a arranged in parallel with an upper face of the armrest; and a pair of leg portions 113b, 113c which are extended downward from the front and the rear end of the palm support portion 113a and attached to the front end portion of the armrest. In the palm support portion 113a, there are provided a dial 111 and joy stick switch (multidirectional switch in which a push switch is built) 117. The joy stick switch 117 may be a push switch, a 2-directional switch, a 4-directional switch, or the like. A recess portion 115 is formed in a portion close to the center of an upper face of the body case 113. The joy stick switch 117 is arranged so that a top portion of the joy stick switch operating portion 114 can not protrude from an upper opening end of the recess portion 115.

Reference numeral 115 is a bowl-shaped recess portion having no bottom which is formed on the upper face of the body case 113 in such a manner that the bowl-shaped recess portion 115 surrounds the joy stick switch operating portion 114. An insertion hole is formed at the center of the recess portion 115, and the joy stick operating portion 114 is inserted into this insertion hole.

As described above, the user can easily hold the main input device 107 by fumbling for it. Due to the foregoing, the dial 111 and operation switches 112A, 112B, and 112C can be easily operated by the user. As a result, the quality of operation can be enhanced.

It is possible for the user to operate the joy stick switch operating portion 114 under a stable condition. Therefore, it is possible for the user to accurately transmit a movement of the thumb to the joy stick switch operating portion 114. Accordingly, the user can operate according to his intention without being affected by vibration of a vehicle caused during operation.

Embodiment 6

In this embodiment, parts, which are similar to the parts in the embodiment 5, are allotted the same reference numerals.

Figure 14:
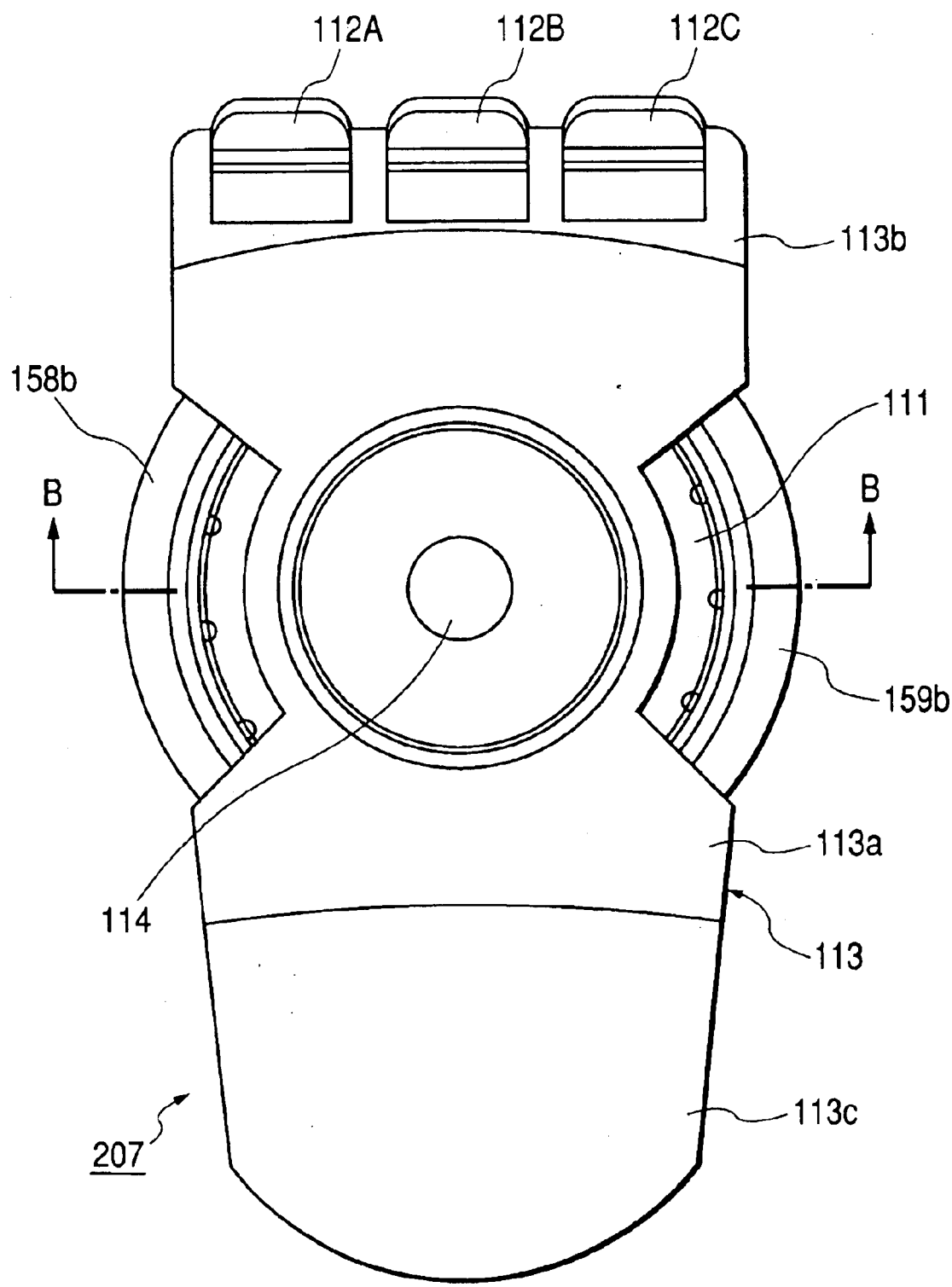
FIG. 14 is a plan view of a main input device according to Embodiment 6 of the present invention.
Figure 15:
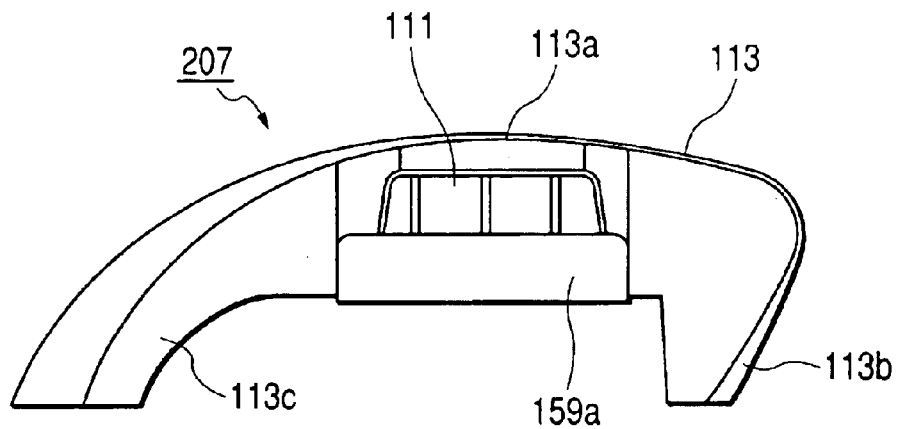
FIG. 15 is a side view of the main input device according to Embodiment 6 of the present invention.
Figure 16:
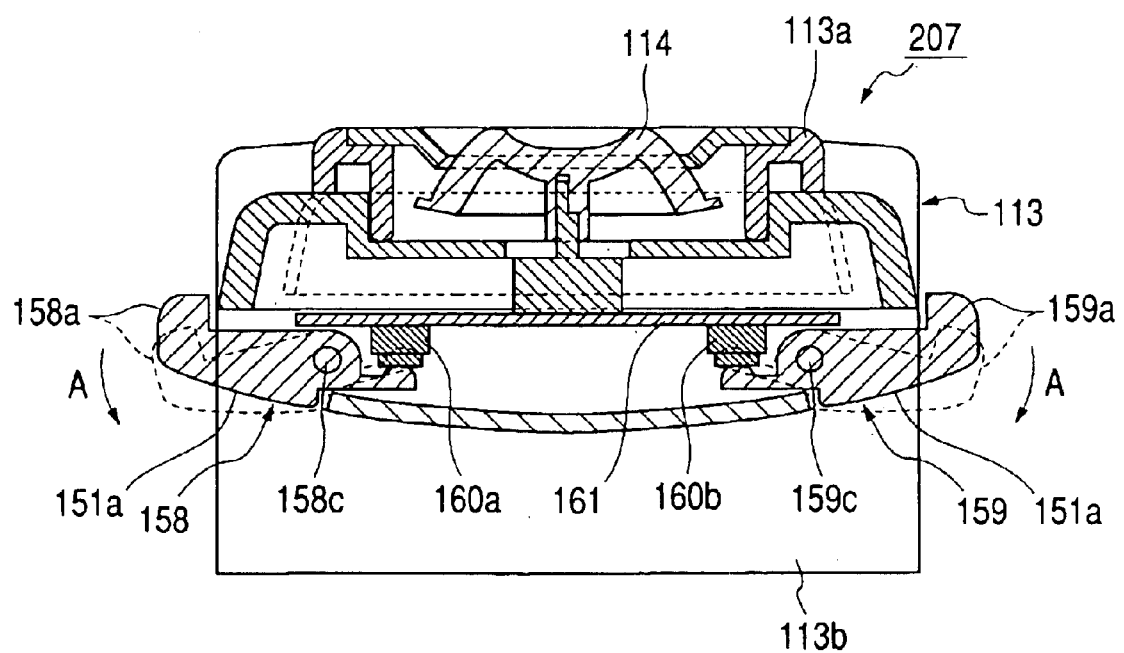
FIG. 16 is a sectional view of the main input device according to Embodiment 6 of the present invention taken along line B—B shown in FIG. 14.

FIG. 14 is a plan view of a main input device 207 according to the embodiment. FIG. 15 is a side view of the main input device 207. FIG. 16 is a sectional view of the main input device 207 taken along line B—B shown in FIG. 14.

The main input device 207 has Enter switches 158, 159, which are different from the Enter switch 120 of the embodiment 5 in structure. The Enter switches 158, 159 will be described below.

Operation portions 158a, 159a of the Enter switches 158, 159 are disposed on the underside of the dial 111 so that the dial 111 overlap the Enter switches 158, 159. The operation portions 158a, 159a are arranged to protrude outside an outer surface of the dial 111. In other words, the operation portions 158a, 159a are arranged so that the user can easily push down the operation portions 158a, 159a from the dial 111 side.

Next, detailed structure of the operation portions 158a, 159a of the Enter switches 158, 159 will be given.

As shown in FIGS. 14 and 15, the operation portion 158a, 159a has circular arc shape and include wall portions 158b, 159b along outer edge thereof. The wall portions 158b, 159b rise upward. When the Enter switches 158, 159 are attached to the main input device 217, the Enter switches 158, 159 are arranged so that bottom of outer periphery of the dial 111 locate on a inner surface side of the wall portions 158b, 159b.

Of side surfaces of the operation portions 158a, 159a, on both side surfaces perpendicular to the wall portions 158b, 159b, a pair of rotating shafts 158c, 159c are disposed. Each of rotating shafts 158c, 159c is rotatably supported by each of a pair of supporting members 151a, 151b.

In the above described structure, after rotationally operating the dial 111, the user moves his finger downward and pushes down one of the operation portions 158a, 159a of the Enter switches 158, 159 in an arrow A direction shown in FIG. 16, and whereby the one of the operation portions 158a, 159a is rotated around the corresponding rotating shafts 158c, 159c by a predetermined degrees and is moved from a position where the operation portions 158a, 159a is indicated by a solid line to a position where indicated by a dashed line. As a result, a switch 160a, 160b disposed on a circuit board 161 is turned on. When the user stops to push down the one of the operation portions 158a, 159a to release, the one of the operation portions 158a, 159a is returned by spring force (not shown) to the position where indicated by the solid line.

In the embodiments described above, explanations are made into a case in which the present invention is applied to an operating device of an apparatus mounted on a vehicle. However, it is possible to apply the present invention to an operating device of a ship, airplane or train.

As described above, according to the present invention, the operation means includes: a rotary dial; a dial cover from which an operating portion of this dial is protruded; and a plurality of switches arranged adjacent to the dial. Therefore, it is possible for the user to operate each switch while the user is putting his hand on the dial cover in a stable posture. Accordingly, it is possible to reduce the occurrence of misoperation. Therefore, it is possible to provide an effect that the occurrence of misoperation is prevented by a mechanism of a low manufacturing cost without using a complicated mechanism.

According to the present invention, there is provided a dial cover in which the dial cover covers an upper face and a predetermined outer circumferential side of the dial, the dial cover has an opening on the side from which a portion of the outer circumferential side of the dial is protruded, and the dial cover has an insertion hole on an upper face from which push switches arranged being protruded from the upper face of the dial are inserted. Due to the above arrangement, it is possible for a user to operate the dial and push switches in a stable condition in which the user puts his hand on the dial cover. Therefore, the occurrence of misoperation of the dial and push switches can be prevented.

According to the present invention, a pair of the openings are laterally arranged on the side of the dial cover. Therefore, the dial can be operated from the right and left. Accordingly, the dial can be easily operated.

According to the present invention, the dial cover covers push switches, which are arranged being protruded from an upper face of the dial, so that the push switches can not be protruded from an upper face of the dial cover, and a recess portion is formed at a peripheral edge of an opening of the insertion hole, into which the push switches are inserted, arranged on an upper face of the dial cover. Therefore, a user can easily touch the push switches with his fingers while the user's fingers are coming into contact with the recess portion at the circumferential edge of the opening of the dial cover. Accordingly, the switches can be easily operated.

According to the present invention, the switches are arranged so that a user can operate a plurality of switches while the user is putting his hand on the dial cover. Due to the above arrangement, the user can operate each switch while the user is putting his hand on the dial cover so as to stabilize his posture without greatly moving his hand.

According to the present invention, a plurality of switches are laterally arranged symmetrically to each other with respect to the dial when a user faces the switches. Therefore, the user can effectively operate the switches with all his fingers of one hand.

According to the present invention, a plurality of switches arranged close to the dial are composed of panel switches. Therefore, the number of protrusions on the dashboard can be reduced. Accordingly, the beauty in the vehicle chamber can be enhanced.

According to the present invention, an operating device for operating apparatus mounted on a vehicle further comprises: a detecting unit for detecting a direction and a quantity of rotation of the dial; and a control unit for transmitting control signals to the apparatus mounted on the vehicle according to signals corresponding to a direction and a quantity of rotation outputted from the detecting unit, the control unit for displaying a state of the setting of the apparatus mounted on the vehicle corresponding to the direction and the quantity of rotation of the dial and the control unit for displaying a quantity of operation with respect to the setting. Therefore, a user can conduct adjustment while the user is making sure of operation of the dial on the displayed screen.

According to the present invention, the control unit displays arrangements of the dial and the plurality of switches on the screen display device and also displays functions of the apparatus mounted on the vehicle corresponding to the switches on the screen display device. Therefore, a user can conduct adjustment while the user is making sure of operation of the switches on the displayed screen.

What is claimed is:

1. An operating device for operating an apparatus mounted on a vehicle on a basis of a display on a screen display device, the operating device disposed close to a driver's seat, the operating device comprising:

a dial being rotatable;

a hand support; and a plurality of switches arranged adjacent to the dial, wherein the apparatus mounted on the vehicle is turned on and off by a user when the switches are operated by the user; and wherein the hand support comprises a pair of openings from which operating portions of the dial protrudes, the pair of openings being defined on left and right side surfaces of the hand support, respectively.

2. The operating device according to claim 1, further comprising a multidirectional switch, wherein the hand support covers an upper surface of the dial; and wherein the hand support defines a through hole on an upper surface thereof, into which the multidirectional switch is inserted.

3. The operating device according to claim 2, wherein a push switch is built in the multidirectional switch.

4. The operating device according to claim 2, wherein the hand support covers the multidirectional switch so that the multidirectional switch does not protrude from the upper surface of the hand support; and wherein a recess portion is formed at a peripheral edge of the through hole.

5. The operating device according to claim 1, wherein the switches are arranged so that a user can operate the switches while the user is putting his hand on the hand support.

6. The operating device according to claim 1, wherein the switches are arranged symmetrically with respect to a direction in which the hand support extends.

7. The operating device according to claim 1, further comprising an enter switch disposed at a peripheral portion of the dial.

8. The operation device according to claim 1, further comprising an enter switch disposed on a lower side of the dial.

9. The operating device according to claim 1, wherein items displayed on the display screen device are arranged on a circumference; and wherein rotation of the dial causes a selected item to rotate.

10. The operating device according to claim 1, wherein the dial is rotatable to control the display on the screen display device and provide input to control the apparatus mounted on the vehicle.

11. The operating device according to claim 1, wherein the hand support is non-rotatable and covers an upper surface of the dial.

12. The operating device according to claim 1, wherein the hand support has a surface designed to support a driver's palm.

* * * * *